UNITED STATES PATENT OFFICE.

JAMES J. LEMON, OF ARNOLD, PENNSYLVANIA.

PLASTIC COMPOSITION.

1,418,810.     Specification of Letters Patent.     Patented June 6, 1922.

No Drawing.     Application filed August 28, 1920. Serial No. 406,603.

*To all whom it may concern:*

Be it known that I, JAMES J. LEMON, a citizen of the United States, residing at Arnold, Pennsylvania, have invented a new and useful Plastic Composition, of which the following is a specification.

This invention relates to a composition of matter. While its application is unrestricted, it has been found especially adapted for use as a building block.

It is contemplated to produce a substance which will be a substitute for stone, brick and the like in building construction; which will not rust metal embedded in or associated with it; which may be made of cheap and available materials; which will be free from acids and alkalies; which will be as solid and substantial as ordinary building brick but will permit nails to be driven into it when set; which will be fireproof; which may be made up into any desirable shape or used as a mortar; which will be easily made up; and which will, in a word, lend itself to a large variety of uses, particularly in the plastic art.

The composition is made up of the following ingredients, in approximately the following proportions:—Blast furnace slag, yellow or white and preferably ground finely, 7 parts; sand, of ordinary building variety, 1 part; cement, a fair grade, 1 part; lime, preferably slacked, 1/15th part; water in sufficient quantity to form a paste or mortar of the desired consistency according to the use.

The ingredients are intimately mixed as in a concrete mixer, water being added in quantity to suit the occasion. For a building block the composition, in fairly moist condition is subjected to hydraulic pressure of approximately 40 tons in suitable molds, after which the blocks are thoroughly dried, preferably in the open air so as to be suitably tempered.

It will be understood that slight changes in the proportions are contemplated within the scope of the invention as set forth in the claim.

What I claim is:—

A composition of matter adapted for use as a building block and mortar, comprising yellow or white blast furnace slag, finely ground, approximately seven parts; ordinary building sand, one part; a fair grade of cement, 1 part; lime, one-fifteenth part; and water in sufficient quantity to form a paste or plastic composition of the desired consistency.

In testimony whereof I affix my signature.

JAMES J. LEMON.